UNITED STATES PATENT OFFICE.

HENRY C. RUSSELL AND EDWARD E. HERRINTON, OF GRAND RAPIDS, MICHIGAN.

COMPOUND TO BE USED AS A SUBSTITUTE FOR GLUE, &c.

SPECIFICATION forming part of Letters Patent No. 414,257, dated November 5, 1889.

Application filed December 28, 1886. Serial No. 222,810. (No specimens.)

*To all whom it may concern:*

Be it known that we, HENRY C. RUSSELL and EDWARD E. HERRINTON, of Grand Rapids, in the county of Kent and State of Michigan, have discovered a certain new and useful Compound to be Used as a Substitute for Glue and other Cements; and we do hereby declare the following to be a full, clear, and exact description of the same, such as will enable others skilled in the art to which it pertains to make and use the same.

Our invention relates to a new compound to be used as a substitute for glue and other cements, the ingredients of which are glue, whiting, linseed-oil, white or red lead, litharge, borax, and water. For most purposes we have obtained the best results by mixing the ingredients in the following proportions, to wit: pulverized glue, one pound; whiting, one pound; white or red lead, dry, one-half pound; litharge, one-quarter pound; borax, one ounce; linseed-oil, one pound; water, five pounds.

The material, except the oil and water, are mixed dry. The water is then added and warmed until the glue is dissolved. Meantime the mixture is thoroughly surged. Next the oil is added and the mixture stirred rapidly until the oil is well incorporated.

This compound is far superior to glue in several respects. For instance, its adhesive qualities are stronger than glue; it is impervious to water; it does not set so quickly as glue, thereby giving more time to assemble the pieces that are to be united; it may be used in a cold room and spread over large surfaces—in fact, it may be used in many ways where it would be impracticable to use glue.

Like most compounds of analogous character, the proportions in which the ingredients are mixed may be varied more or less without materially changing the result, and for some purposes a change might be made in such proportions with advantage. For instance, for cheapening the compound, use less glue or glue of an inferior quality. If the work is to be exposed to water, as in the case of boats, water-tanks, &c., use a little more lead. If the compound is to be used very thin, add more water or oil, or both, in which case a little more borax had better be used to insure the permanent mixing of the oil and water. The linseed-oil may be boiled or used raw. We have used it in both conditions with substantially the same result; and as between white and red lead there seems to be little choice.

What we claim is—

1. A new compound of matter for cement, consisting, essentially, of glue, whiting, white or red lead, litharge, borax, oil, and water, mixed substantially as described, and for the purposes set forth.

2. The improved cement, consisting of glue, whiting, oil, and white or red lead, substantially in the proportions specified.

3. The improved cement, consisting of glue, whiting, oil, white or red lead, and litharge, substantially in the proportions specified.

In testimony whereof we sign this specification, in the presence of two witnesses, this 6th day of December, 1886.

HENRY C. RUSSELL.
EDWARD E. HERRINTON.

Witnesses:
C. VAN CLEVE GANSON,
WILLIAM W. ALLAN.